United States Patent
Hara et al.

(10) Patent No.: US 12,043,238 B2
(45) Date of Patent: Jul. 23, 2024

(54) VEHICLE CONTROL METHOD AND VEHICLE

(71) Applicant: TOYOTA JIDOSHA KABUSHIKI KAISHA, Toyota (JP)

(72) Inventors: Masahiro Hara, Gotemba (JP); Masahiko Maekawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 227 days.

(21) Appl. No.: 17/893,774

(22) Filed: Aug. 23, 2022

(65) Prior Publication Data

US 2023/0182699 A1 Jun. 15, 2023

(30) Foreign Application Priority Data

Dec. 9, 2021 (JP) ................................. 2021-200013

(51) Int. Cl.
*B60L 3/10* (2006.01)
*B60L 7/26* (2006.01)
*B60T 8/1761* (2006.01)

(52) U.S. Cl.
CPC ............ *B60T 8/17616* (2013.01); *B60L 7/26* (2013.01); *B60L 2240/465* (2013.01); *B60T 2270/602* (2013.01)

(58) Field of Classification Search
CPC ............... B60L 50/16; B60L 3/10; B60L 7/26
See application file for complete search history.

(56) References Cited

U.S. PATENT DOCUMENTS

| 5,653,515 | A | * | 8/1997 | Takeda | ...................... B60T 8/00 303/113.4 |
| 5,952,654 | A | * | 9/1999 | Giese | .................. H01J 49/0409 436/155 |
| 6,122,585 | A | * | 9/2000 | Ono | ........................ B60T 8/445 303/166 |
| 6,421,598 | B1 | * | 7/2002 | Oshiro | ................ B60T 8/17616 701/80 |

(Continued)

FOREIGN PATENT DOCUMENTS

| JP | 7-257347 A | 10/1995 |
| JP | 10-244930 A | 9/1998 |

(Continued)

*Primary Examiner* — Long T Tran
(74) *Attorney, Agent, or Firm* — Sughrue Mion, PLLC (57) ABSTRACT

A vehicle control method includes first anti-lock braking system control which is executed focusing on a vehicle deceleration when determination is made that a road is a bad road based on wheel acceleration information, as compared with a case where determination is made that the road is not the bad road, and a second anti-lock braking system control which is executed to reduce a pressure increasing gradient of a brake hydraulic pressure as compared with that in the first anti-lock braking system control. The vehicle control method includes executing the first anti-lock braking system control in a case where a wheel has a recovering tendency from slip when an execution condition of the anti-lock braking system control is satisfied, and executing the second anti-lock braking system control in a case where the wheel has a slipping tendency when the execution condition of the anti-lock braking system control is satisfied.

12 Claims, 6 Drawing Sheets

(56) References Cited

U.S. PATENT DOCUMENTS

| | | |
|---|---|---|
| 2002/0002435 A1 | 1/2002 | Ohtsu |
| 2010/0009808 A1* | 1/2010 | Ohtsu ................. B60T 8/17616 |
| | | 477/185 |
| 2010/0250081 A1* | 9/2010 | Kinser .................... B60T 8/173 |
| | | 701/70 |
| 2011/0066326 A1* | 3/2011 | Kashiwamura ............................ |
| | | B60W 30/18109 |
| | | 701/38 |
| 2016/0272176 A1* | 9/2016 | Furuyama ............. B60T 8/1761 |
| 2017/0267220 A1* | 9/2017 | Serra ....................... B60T 8/172 |
| 2020/0198475 A1* | 6/2020 | Kaneko ................. B60W 10/04 |

FOREIGN PATENT DOCUMENTS

| | | |
|---|---|---|
| JP | 2002-12139 A | 1/2002 |
| JP | 2017-154531 A | 9/2017 |

\* cited by examiner

VEHICLE CONTROL METHOD AND VEHICLE

CROSS-REFERENCE TO RELATED APPLICATION

This application claims priority to Japanese Patent Application No. 2021-200013 filed on Dec. 9, 2021, incorporated herein by reference in its entirety.

BACKGROUND

1. Technical Field

The present disclosure relates to a vehicle control method and a vehicle.

2. Description of Related Art

Japanese Unexamined Patent Application Publication No. 2017-154531 (JP 2017-154531 A) discloses a technology for accurately determining whether a road where a vehicle is traveling is a bad road even under a situation in which the braking torque of wheels is fluctuating.

SUMMARY

When anti-lock braking system (ABS) control is executed during vehicle braking, wheel vibration due to inertia in a drive system of the vehicle (torsional vibration in the drive system) may occur along with increase and decrease in a braking force by the ABS control. In a vehicle having large inertia in the drive system, the wheel vibration increases and is difficult to converge as compared with a vehicle having small inertia. When the ABS control is influenced by such wheel vibration, the ABS control performance may decrease.

The present disclosure provides a vehicle control method that suppresses a decrease in ABS control performance due to influence of wheel vibration caused along with execution of ABS control on a vehicle, and also provides a vehicle that performs this control method.

A first aspect of the present disclosure relates to a method for controlling a vehicle configured to execute anti-lock braking system control. The anti-lock braking system control includes first anti-lock braking system control and second anti-lock braking system control. The first anti-lock braking system control is executed focusing on a vehicle deceleration of the vehicle when determination is made that a road is a bad road based on wheel acceleration information of the vehicle, as compared with a case where determination is made that the road is not the bad road. The second anti-lock braking system control is executed to reduce a pressure increasing gradient of a brake hydraulic pressure of the vehicle as compared with a pressure increasing gradient in the first anti-lock braking system control when determination is made that the road is the bad road based on the wheel acceleration information. The vehicle control method includes executing the first anti-lock braking system control in a case where a wheel of the vehicle has a recovering tendency from slip when an execution condition of the anti-lock braking system control is satisfied. The vehicle control method includes executing the second anti-lock braking system control in a case where the wheel has a slipping tendency when the execution condition of the anti-lock braking system control is satisfied.

A second aspect of the present disclosure relates to a vehicle including a braking device and an electronic control unit. The braking device includes a brake actuator configured to control a brake hydraulic pressure to be applied to a wheel of the vehicle. The electronic control unit is configured to control the braking device to execute anti-lock braking system control. The anti-lock braking system control includes first anti-lock braking system control and second anti-lock braking system control. The first anti-lock braking system control is executed focusing on a vehicle deceleration of the vehicle when determination is made that a road is a bad road based on wheel acceleration information of the vehicle, as compared with a case where determination is made that the road is not the bad road. The second anti-lock braking system control is executed to reduce a pressure increasing gradient of the brake hydraulic pressure as compared with a pressure increasing gradient in the first anti-lock braking system control when determination is made that the road is the bad road based on the wheel acceleration information. The electronic control unit is configured to execute the first anti-lock braking system control in a case where the wheel has a recovering tendency from slip when an execution condition of the anti-lock braking system control is satisfied, and execute the second anti-lock braking system control in a case where the wheel has a slipping tendency when the execution condition of the anti-lock braking system control is satisfied.

The wheel acceleration information is influenced by wheel vibration of the vehicle that occurs along with execution of the anti-lock braking system control. When the wheel vibration occurs during the execution of the first anti-lock braking system control, erroneous determination may be made that the vehicle is traveling on the bad road because of the occurrence of the wheel vibration. When such erroneous determination is made in the case where the wheel has the slipping tendency during the execution of the first anti-lock braking system control, transition is made to the control focusing on the vehicle deceleration suitable for traveling on the bad road, and the performance of the anti-lock braking system control may decrease. According to the vehicle control method of the first aspect of the present disclosure and the vehicle of the second aspect that performs the control method, when the wheel has the slipping tendency, the second anti-lock braking system control is executed to reduce the pressure increasing gradient of the brake hydraulic pressure as compared with that in the first anti-lock braking system control. As a result, when the wheel has the slipping tendency, it is possible to suppress transition to the anti-lock braking system control that exacerbates the slipping tendency due to the occurrence of the wheel vibration. Therefore, it is possible to suppress the decrease in the performance of the anti-lock braking system control due to the influence of the wheel vibration caused along with the execution of the anti-lock braking system control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the accompanying drawings. When numerical values such as number, quantity, amount, range, etc. are mentioned regarding an element in the following embodiment, the technical idea according to the present disclosure is not limited to the mentioned numerical values unless otherwise specified or unless clearly limited to the mentioned numerical values in principle.

Figure 1:
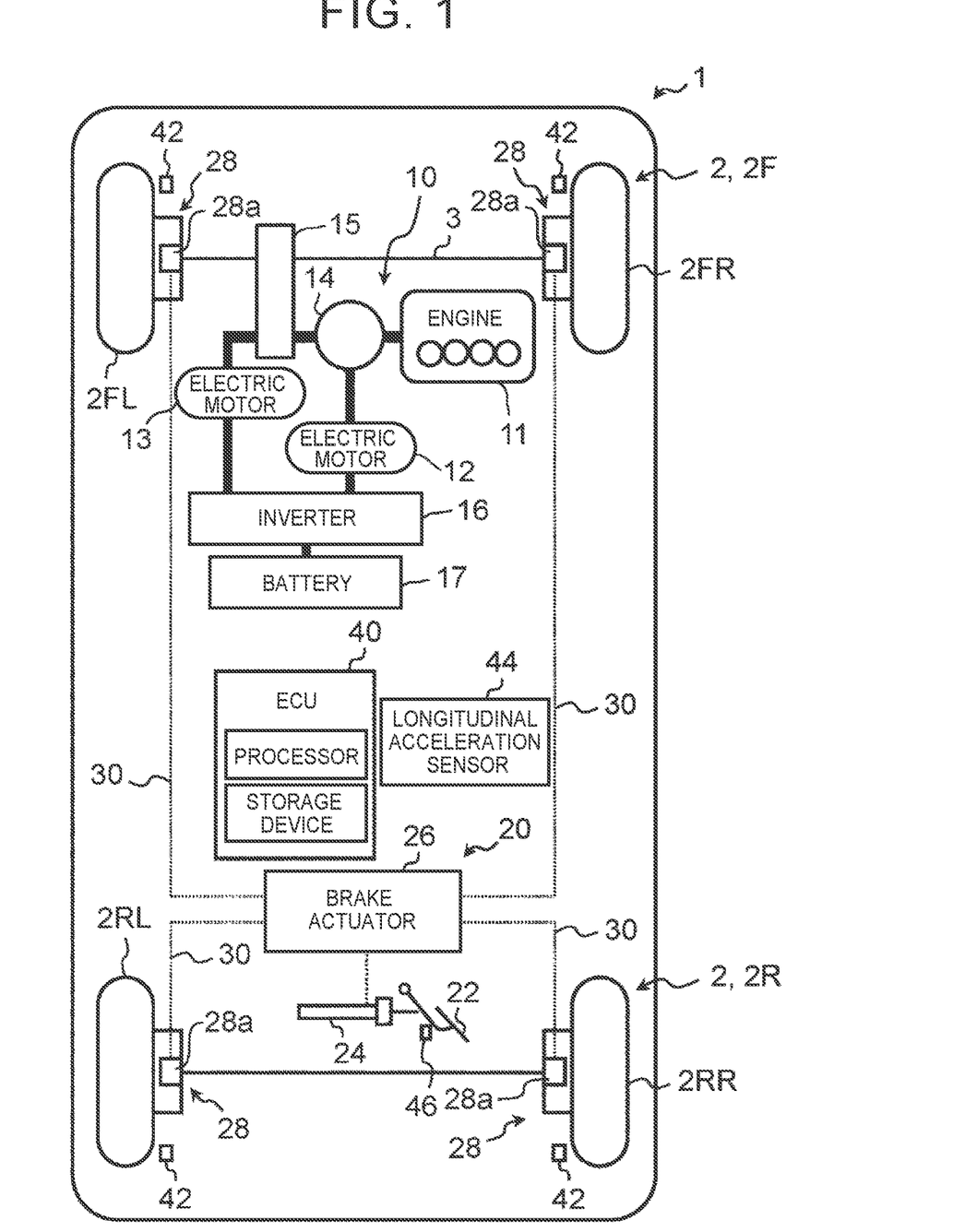
FIG. 1 is a diagram schematically showing a configuration of a vehicle according to an exemplary embodiment of the present disclosure.

First, a configuration example of a vehicle of the present disclosure will be described. FIG. 1 is a diagram schematically showing an example of the configuration of a vehicle 1 according to the embodiment. The vehicle 1 includes four wheels 2. In the following description, a left front wheel, a right front wheel, a left rear wheel, and a right rear wheel are represented by 2FL, 2FR, 2RL, and 2RR, respectively. The front wheels may collectively be represented by 2F, and the rear wheels may collectively be represented by 2R.

Examples of the vehicle 1 include a hybrid electric vehicle (HEV) including a power train 10. For example, the power train 10 includes an internal combustion engine 11 and two electric motors 12 and 13 as the source of a driving force. The electric motors 12 and 13 also function as generators. More specifically, the electric motor 12 mainly functions as a generator, and the electric motor 13 mainly functions as an electric motor.

The electric motor 12 and the internal combustion engine 11 are connected to each other by a power split mechanism 14. The power split mechanism 14 and the electric motor 13 are connected to each other via a speed reducer 15. The speed reducer 15 includes a differential and is connected to the front wheels 2F via drive shafts 3. The power split mechanism 14 distributes power output from the internal combustion engine 11 to the electric motor (generator) 12 and the speed reducer 15. The speed reducer 15 performs speed reduction for the power output from the internal combustion engine 11 and transmitted via the power split mechanism 14 and power output from the electric motor 13, and transmits the output power to the front wheels 2F via the drive shafts 3. As described above, the vehicle 1 is front-wheel drive, but the "vehicle" according to the present disclosure may be rear-wheel drive or four-wheel drive.

Examples of the electric motors 12 and 13 include alternating current synchronous motors. The electric motor 13 is driven by alternating current power supplied from an inverter 16. The electric motor 13 functions as a regenerative generator by being driven by rotation of the front wheels 2F, and can also apply a regenerative braking force to the front wheels 2F. Electric power generated by the electric motor 13 is converted from an alternating current to a direct current by the inverter 16 and stored in a rechargeable battery 17. The inverter 16 converts the electric power stored in the battery 17 from a direct current to an alternating current and supplies the converted electric power to the electric motor 13. The inverter 16 also converts the electric power generated by the electric motor 12 by the power output from the internal combustion engine 11 from an alternating current to a direct current and stores the converted electric power in the battery 17.

The vehicle 1 includes a braking device 20. The braking device 20 includes a brake pedal 22, a master cylinder 24, a brake actuator 26, brake mechanisms 28, and hydraulic pipes 30. The master cylinder 24 generates a hydraulic pressure based on a pedaling force on the brake pedal 22, and supplies the generated hydraulic pressure (brake hydraulic pressure) to the brake actuator 26.

The brake actuator 26 includes a hydraulic circuit (not shown) interposed between the master cylinder 24 and the brake mechanisms 28. The hydraulic circuit includes a pump for increasing the brake hydraulic pressure without depending on the master cylinder pressure, a reservoir for storing a brake fluid, and a plurality of solenoid valves.

The brake mechanisms 28 are connected to the brake actuator 26 via the hydraulic pipes 30. The brake mechanisms 28 are arranged on the respective wheels 2. The brake actuator 26 distributes the brake hydraulic pressure to the brake mechanisms 28 of the wheels 2. More specifically, the brake actuator 26 can supply the brake hydraulic pressure to the brake mechanisms 28 of the wheels 2 by using the master cylinder 24 or the pump as a pressure source. The brake mechanism 28 includes a wheel cylinder 28a that operates based on the supplied brake hydraulic pressure. By operating the wheel cylinder 28a by the brake hydraulic pressure, a brake pad is pressed against a brake disc. As a result, a friction braking force is applied to the wheel 2.

The brake actuator 26 can independently adjust the brake hydraulic pressure to be applied to each wheel 2 by controlling various solenoid valves provided in the hydraulic circuit. More specifically, the brake actuator 26 has a pressure increasing mode for increasing the pressure, a keeping mode for keeping the pressure, and a pressure reducing mode for reducing the pressure as control modes of the brake hydraulic pressure. By controlling ON/OFF of various solenoid valves, the brake actuator 26 can change the control mode of the brake hydraulic pressure for each wheel 2. The friction braking force applied to each wheel 2 is determined based on the brake hydraulic pressure supplied to each wheel cylinder 28a. By such a change in the control mode, the brake actuator 26 can independently control the braking force of each wheel 2.

The vehicle 1 further includes an electronic control unit (ECU) 40. The ECU 40 includes a processor, a storage device, and an input/output interface. The input/output interface acquires sensor signals from various sensors mounted on the vehicle 1 and outputs operation signals to the power train 10 (internal combustion engine 11, electric motors 12 and 13, and inverter 16) and the braking device 20 (brake actuator 26). Various control programs for controlling the power train 10 and the braking device 20 are stored in the storage device. The processor reads and executes the control programs in the storage device, thereby implementing various types of control using the power train 10 and the braking device 20. The number of ECUs 40 may be plural. For example, the ECU 40 may include one or more ECUs that control the power train 10 and one or more ECUs that control the braking device 20.

Examples of the various sensors include wheel speed sensors 42, a longitudinal acceleration sensor 44, and a brake position sensor 46. The wheel speed sensor 42 is arranged in association with each wheel 2 and outputs a wheel speed signal based on a rotation speed of the wheel 2. The longitudinal acceleration sensor 44 outputs an acceleration signal based on an acceleration in a fore-and-aft direction of the vehicle 1 (longitudinal acceleration Gx). The brake position sensor 46 outputs a signal based on an amount of depression of the brake pedal 22.

Next, control during ABS braking will be described. A braking period during which ABS control is being executed is hereinafter referred to as "period during ABS braking". The control to be executed by the ECU 40 during the ABS braking includes the following "anti-lock braking system control (ABS control)" and "vibration damping control by power train 10". The vibration damping control by the power train (PT) 10 is hereinafter referred to also as "PT vibration damping control".

Next, the basic configuration of the ABS control will be described. The ABS control involves controlling the brake actuator 26 so that an actual slip ratio S of each wheel 2 reaches a predetermined target slip ratio St (for example, 10%). For example, the actual slip ratio S of each wheel 2 can be calculated according to Mathematical Expression (1) based on a wheel speed Vw detected by the wheel speed sensor 42 and a vehicle body speed (estimated vehicle body speed Vx). The estimated vehicle body speed Vx can be calculated by a known method based on, for example, the largest value among the wheel speeds Vw of the wheels 2 detected by the wheel speed sensors 42.

[Mathematical Expression 1]

$$S = \frac{Vw - Vx}{Vx} \times 100 \tag{1}$$

According to Mathematical Expression (1), when any wheel 2 tends to lock during the braking, the wheel speed Vw of the wheel 2 is lower than the estimated vehicle body speed Vx, and the actual slip ratio S exhibits a negative value. As the amount of decrease in the wheel speed Vw with respect to the estimated vehicle body speed Vx increases, the actual slip ratio S decreases (increases to the negative side).

An ABS control execution condition is satisfied, for example, in response to detection that any wheel 2 tends to lock (may make transition to a locked state). Whether the wheel 2 tends to lock is determined based on, for example, whether the actual slip ratio S of the wheel 2 is lower than a predetermined threshold (negative value). During the execution of the ABS control, the brake actuator 26 controls the braking force to be applied to the wheel 2 having the locking tendency by controlling the brake hydraulic pressure acting on the corresponding wheel cylinder 28a in order to bring the actual slip ratio S of the wheel 2 closer to the target slip ratio St. Specifically, the brake hydraulic pressure is first reduced in order to restore the actual slip ratio S increased to the negative side (bring the actual slip ratio S closer to zero), and then the brake hydraulic pressure is kept. When the actual slip ratio S is restored while the brake hydraulic pressure is kept, the brake hydraulic pressure is increased. During the execution of the ABS control, the brake hydraulic pressure (braking force) is increased and reduced repeatedly as described above. When the vehicle 1 is stopped or the actual slip ratio S of the wheel 2 having the locking tendency is restored to the predetermined threshold or higher, the ABS control is terminated. According to such ABS control, the braking distance of the vehicle 1 can be shortened.

Next, the basic configuration of the PT vibration damping control will be described. The PT vibration damping control to be executed on the power train 10 side involves controlling a torque of the electric motor 13 to suppress wheel vibration that may occur during the execution of the ABS control. More specifically, the wheel vibration occurs along with increase and decrease in the braking force by the ABS control. As shown in, for example, FIG. 2 or FIG. 3 described later, the wheel vibration appears as vibration of a wheel acceleration Aw. The frequency (period) of the vibration of the wheel acceleration Aw differs depending on the specifications (vibration characteristics) of the vehicle. Therefore, in the PT vibration damping control, the ECU 40 controls the electric motor 13 to output, for example, a torque that fluctuates positively or negatively at a frequency corresponding to the frequency of the vibration of the wheel acceleration Aw acquired in advance. Whether to execute such PT vibration damping control is determined based on a request from the control on the braking device 20 side, and details thereof will be described later with reference to FIG. 4.

In the example of the vehicle 1 shown in FIG. 1, the electric motor 13 for driving the front wheels F2 corresponds to an example of "one or more electric motors" according to the present disclosure. Instead of such an example, the one or more electric motors may drive the rear wheels or may drive the front and rear wheels.

Figure 2:
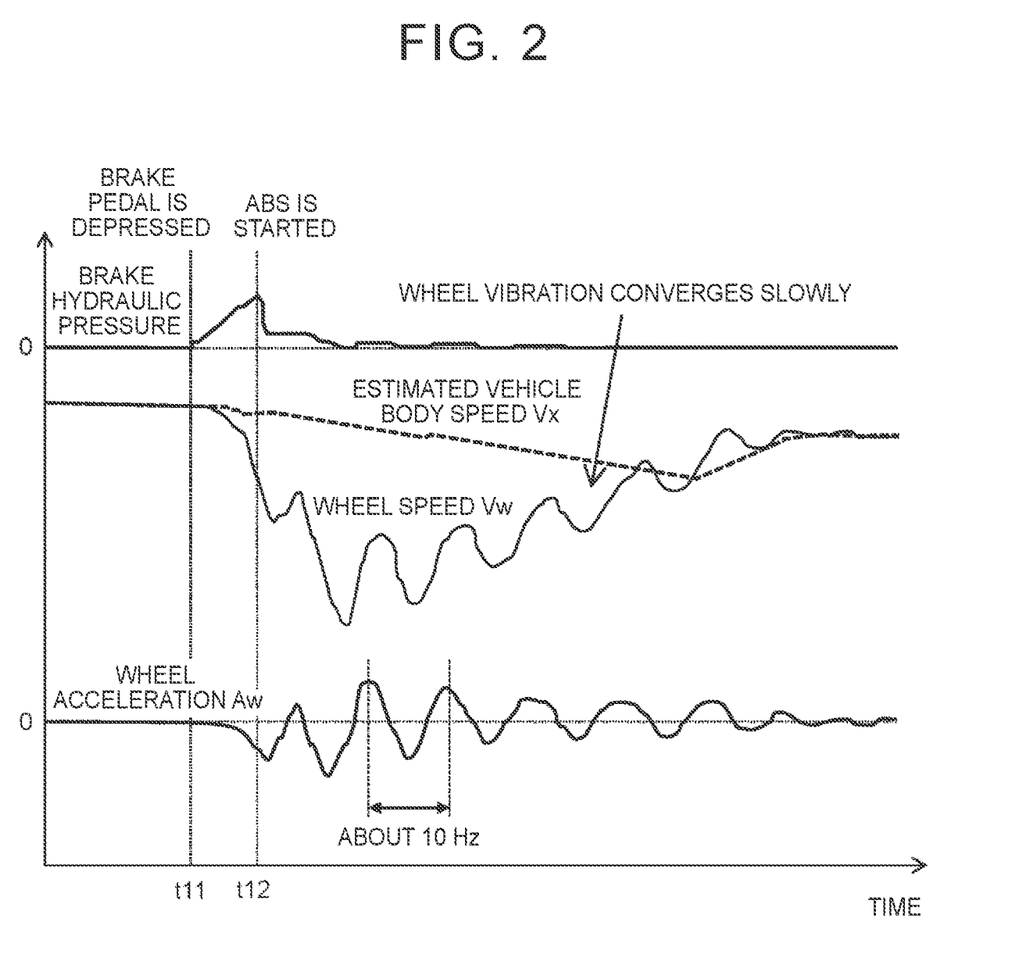
FIG. 2 is a time chart for describing problems during ABS braking in which general ABS control adopted by the vehicle is executed.

Next, problems during the ABS braking will be described. FIG. 2 is a time chart for describing problems during ABS braking in which general ABS control is executed. In FIG. 2, the brake pedal is depressed at a time t11, and the brake hydraulic pressure is increased accordingly. That is, braking is started. Along with the start of braking, the wheel speed Vw of a certain wheel decreases with respect to the estimated vehicle body speed Vx. At a time t12, the ABS control is started. As a result, the brake hydraulic pressure of the wheel is controlled by the ABS control. Specifically, the brake hydraulic pressure is first reduced.

Along with the start of the ABS control, the wheel vibration (torsional vibration in the drive system of the vehicle) forced by the braking force through the ABS control occurs. As shown in FIG. 2, the wheel vibration appears in the waveform of the wheel acceleration Aw and the waveform of the wheel speed Vw. In the example of the vehicle shown in FIG. 2, the wheel acceleration Aw vibrates at about 10 Hz.

Such wheel vibration occurs due to inertia in the drive system. In addition, tire inertia also influences the wheel vibration. The power train 10 of the vehicle 1 of the present embodiment that is the HEV includes, as the drive system, a transaxle (T/A) including the electric motors 12 and 13, the power split mechanism 14, and the speed reducer 15. Therefore, the vehicle 1 corresponds to an example of a vehicle having large inertia in the drive system or the like. In the vehicle having large inertia as in the vehicle 1, the wheel vibration increases and is difficult to converge as shown in FIG. 2 as compared with a vehicle having small inertia. This problem is more conspicuous on low μ roads.

When the ABS control is influenced by the wheel vibration, the ABS control performance may decrease. Hereinafter, adverse effects caused by the wheel vibration that may lead to the decrease in the ABS control performance will be described with reference to FIG. 3. There are two examples of the adverse effects described herein: "erroneous increase in brake hydraulic pressure" and "erroneous bad road determination".

The "bad road determination" is herein determination as to whether a road where the vehicle is traveling is a bad road, and can be made based on wheel acceleration information. The "wheel acceleration information" used for this determination is, for example, an amplitude of the wheel acceleration Aw. Specifically, determination is made that the road where the vehicle is traveling is a bad road, for example, when the amplitude of the wheel acceleration Aw during a predetermined period is equal to or larger than a threshold (that is, the wheel vibration is significant). For example, an amplitude of the wheel speed Vw may be used as the wheel acceleration information. For example, determination may be made that the road where the vehicle is traveling is a bad road when the amplitude of the wheel speed Vw during the predetermined period is equal to or larger than a threshold. As the wheel acceleration information, a period of the wheel acceleration Aw or the wheel speed Vw may be used instead of or in combination with the amplitude.

Figure 3:
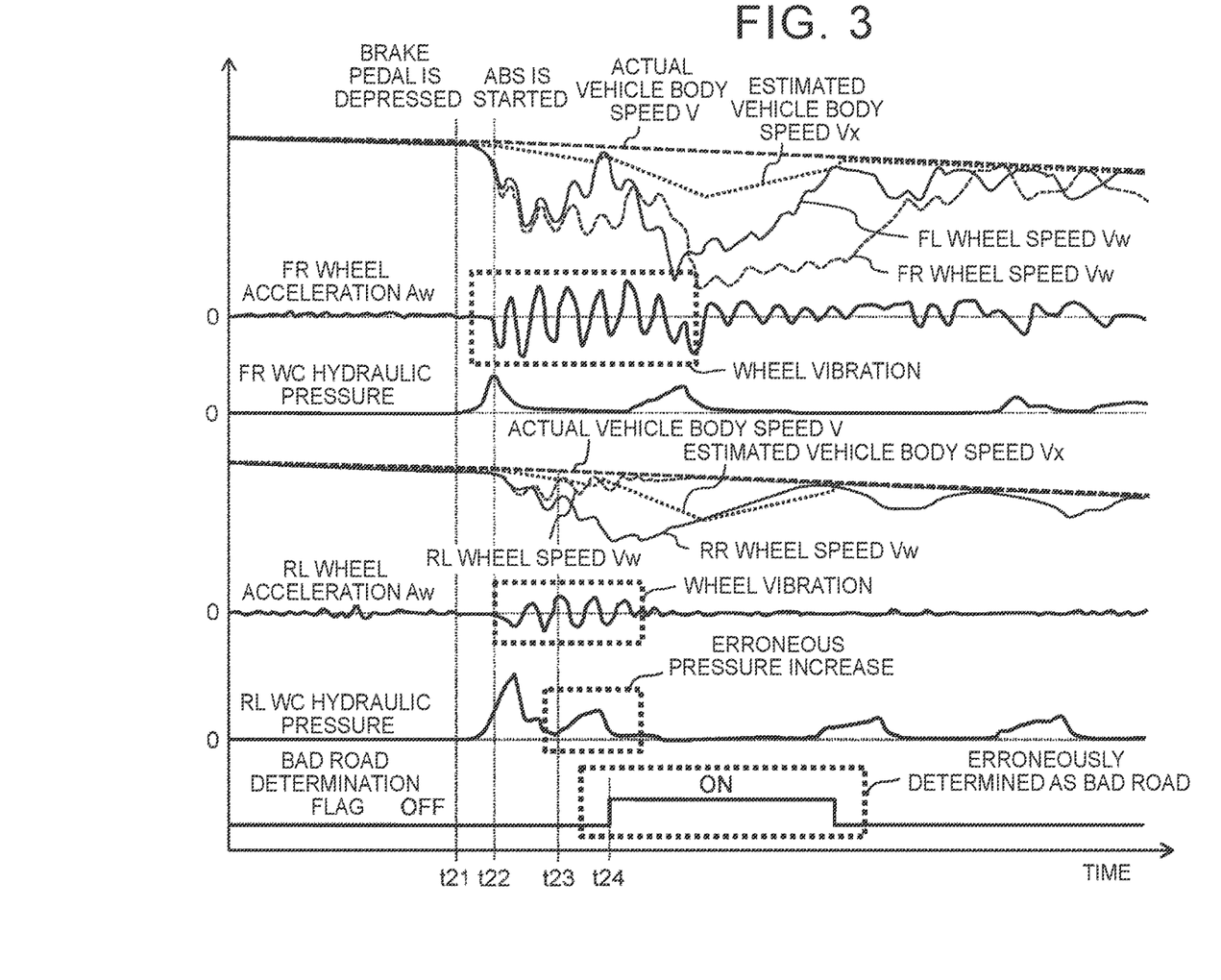
FIG. 3 is a time chart for describing examples of adverse effects caused by wheel vibration occurring when the vehicle is traveling.

FIG. 3 is a time chart for describing the examples of the adverse effects caused by the wheel vibration (erroneous increase in brake hydraulic pressure and erroneous bad road determination). FIG. 3 shows an example of operation when general ABS control is performed during braking on an even low μ road that is not a bad road. FIG. 3 shows waveforms of an actual vehicle body speed V, an estimated vehicle body speed Vx, wheel speeds Vw of wheels (right and left front wheels FR and FL and right and left rear wheels RR and RL), accelerations Aw of representative wheels (accelerations of the right front wheel FR and the left rear wheel RL), representative hydraulic pressures (wheel cylinder (WC) hydraulic pressures of the right front wheel FR and the left rear wheel RL), and a bad road determination flag. The bad road determination flag is ON when the bad road determination is established.

In FIG. 3, the brake pedal is depressed at a time t21, and the ABS control is then started at a time t22. As can be seen from the waveforms of the wheel accelerations Aw in FIG. 3, the wheel vibration occurs along with the start of the ABS control. The waveforms of the wheel speeds Vw also vibrate due to the wheel vibration.

In the example shown in FIG. 3, the "erroneous pressure increase" for the brake hydraulic pressure (WC hydraulic pressure) of the left rear wheel RL is started at a time t23 that is not a timing to start the pressure increase by the ABS control. This is because determination is erroneously made that the slip of the left rear wheel RL has ended at the time t23 due to the wheel vibration superimposed on the waveform of the wheel speed Vw of the left rear wheel RL. Such an erroneous pressure increase is a factor that exacerbates the wheel vibration and leads to a decrease in the ABS control performance.

In the example shown in FIG. 3, the bad road determination flag is ON at a subsequent time t24. This is because determination is erroneously made that the vehicle is traveling on a bad road based on the amplitude of the wheel acceleration Aw or the wheel speed Vw on which the wheel vibration is superimposed, even though the vehicle is actually traveling on an even low μ road that is not a bad road. Such "erroneous bad road determination" is likely to occur due to the exacerbation of the wheel vibration caused by the "erroneous increase in brake hydraulic pressure". If the ABS control is configured to switch to ABS control focusing on a deceleration suitable for a bad road in the event of "erroneous increase in brake hydraulic pressure", the wheel vibration is exacerbated and the ABS control performance decreases. The "ABS control focusing on a deceleration suitable for a bad road" is herein executed, for example, by at least one of an increase in a pressure increasing gradient when increasing the brake hydraulic pressure by the ABS control and a reduction (increase to the negative side) in the threshold of the actual slip ratio S at which the reduction in the brake hydraulic pressure is started during the execution of the ABS control.

Next, the outline of the control during the ABS braking in this embodiment will be described.

The ABS control used in the present embodiment includes the following "first ABS control" and "second ABS control".

In view of the problems described above, in the present embodiment, when the ABS control execution condition is satisfied during the braking of the vehicle 1, the first ABS control is executed in a case where the wheels 2 have a recovering tendency from slip, and the second ABS control is executed in a case where the wheels 2 have a slipping tendency. That is, in the present embodiment, the slip status of the wheels 2 is monitored during the execution of the ABS control, and the ABS control is switched between the first ABS control and the second ABS control based on the slip status.

The first ABS control is normal ABS control, in other words, basic ABS control, and has the following features.
(i) Bad road determination: permitted
(ii) Pressure increasing gradient: normal gradient to steep gradient
(iii) Pressure reducing control start threshold: small (started when slip level is high)
(iv) ABS control characteristic: focusing on (prioritizing) vehicle deceleration In the first ABS control, the pressure increasing gradient of the brake hydraulic pressure is variable during the pressure increasing mode. The pressure increasing gradient is made variable depending on, for example, ON/OFF of the bad road determination flag. Specifically, when the bad road determination flag is OFF, the basic pressure increasing gradient (normal gradient) is selected. When the bad road determination flag is ON, a pressure increasing gradient (steep gradient) larger than the normal pressure increasing gradient is selected.

The pressure reducing control start threshold herein corresponds to a threshold (negative value) of the actual slip ratio S to be used for determining whether to start pressure reduction in the process of repeating the increase and reduction in the brake hydraulic pressure during the execution of the ABS control. The pressure reducing control start threshold when the bad road determination flag is ON is set smaller than that when the bad road determination flag is OFF (that is, the pressure reduction is started when the slip level is higher).

Since the pressure increasing gradient and the pressure reducing control start threshold are variable as described above depending on the bad road determination result, the first ABS control is executed focusing on the vehicle deceleration (that is, the control is made suitable for a bad road) in a case where determination is made that the road is a bad road based on the wheel acceleration information, as compared with a case where determination is made that the road is not a bad road.

The second ABS control is used against the wheel vibration (that is, for vibration damping), and has the following features as compared with the first ABS control.
(i) Bad road determination: prohibited
(ii) Pressure increasing gradient: gentle gradient against wheel vibration
(iii) Pressure reducing control start threshold: large (started when slip level is low)

(iv) ABS control characteristic: achieving both vehicle deceleration and braking stability In the second ABS control, the pressure increasing gradient (gentle gradient) is smaller, against the wheel vibration, than the value within the range of the pressure increasing gradient (normal gradient to steep gradient) to be used in the first ABS control. The pressure reducing control start threshold is larger than that in the first ABS control. Therefore, during the execution of the second ABS control, the pressure reduction (pressure reducing mode) is started when the slip level is lower (in other words, the absolute value of the actual slip ratio S is smaller) than that during the execution of the first ABS control.

Due to the differences in the features described above, the first ABS control has the ABS control characteristic prioritizing (focusing on) the vehicle deceleration over the braking stability. As compared with the first ABS control, the second ABS control has the ABS control characteristic that achieves both the deceleration and the braking stability.

The wheel vibration is likely to occur on a low μ road where the road reaction force is small (in other words, the vibration is difficult to converge). In the present embodiment, determination is made as to whether the vehicle 1 is traveling on a low μ road having a friction coefficient equal to or lower than a predetermined value based on the longitudinal acceleration Gx (vehicle deceleration) of the vehicle 1. When determination is made that the vehicle 1 is traveling on the low μ road, the ABS control is switched between the first ABS control and the second ABS control based on whether the wheels 2 have a recovering tendency from slip or have a slipping tendency.

In the present embodiment, when the PT vibration damping control is being executed during the ABS braking, the second ABS control is executed regardless of whether the wheels 2 have the recovering tendency from the slip or have the slipping tendency.

Figure 4:
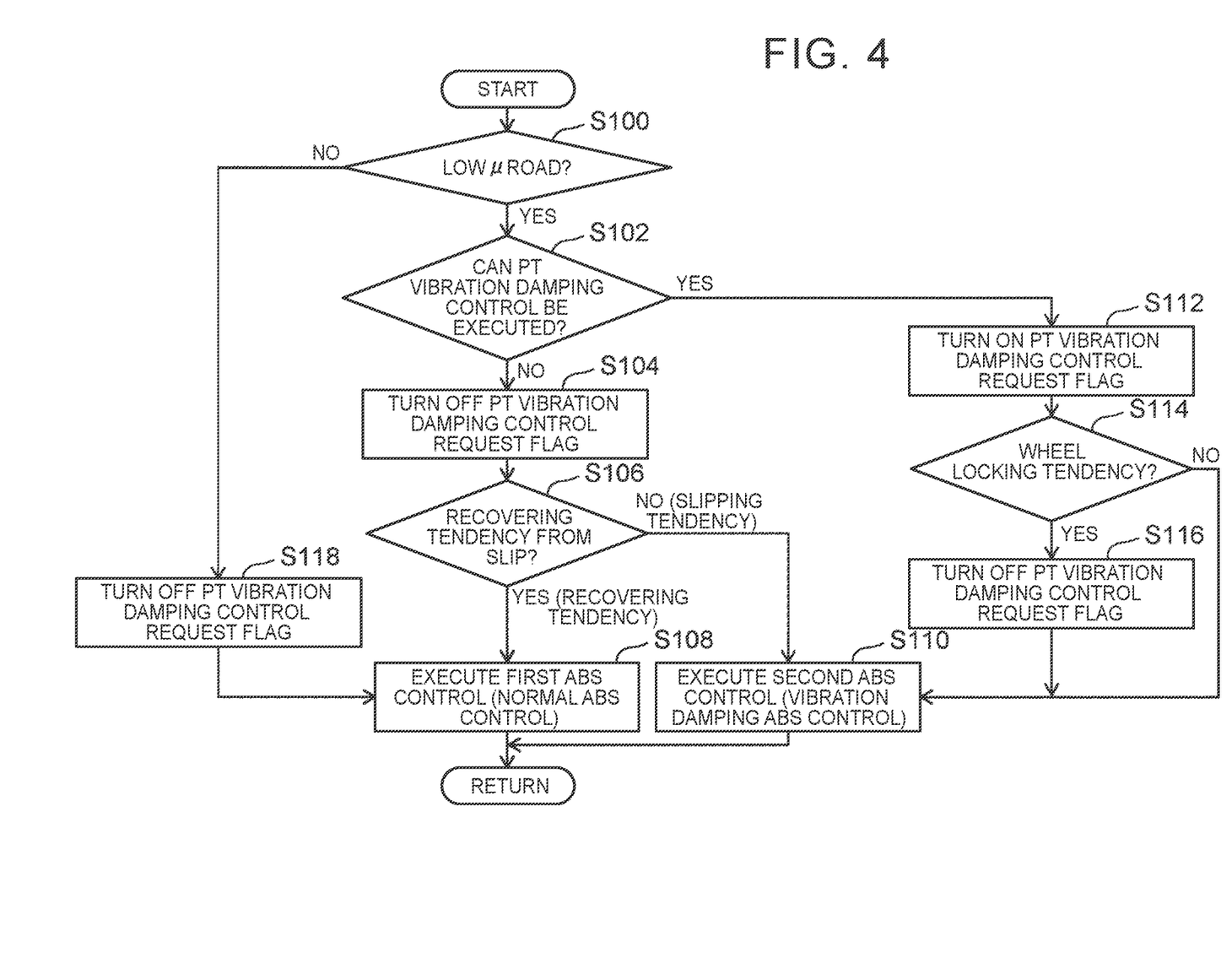
FIG. 4 is a flowchart showing a process related to control during the ABS braking according to the embodiment.

Next, processes to be executed by the ECU will be described. FIG. 4 is a flowchart showing a process related to the control during the ABS braking according to the embodiment. The process in this flowchart is repeatedly executed when the ABS control execution condition is satisfied (that is, during the execution of the ABS control).

In Step S100 of FIG. 4, the ECU 40 determines whether a road where the vehicle 1 is traveling is a low μ road. This determination can be made, for example, based on whether the longitudinal acceleration Gx (vehicle deceleration) detected by the longitudinal acceleration sensor 44 is equal to or lower than a predetermined threshold (for example, 0.4 G). When determination is made that the road is the low μ road, the process proceeds to Step S102.

In Step S102, the ECU 40 determines whether the PT vibration damping control can be executed. The vehicle 1 is basically configured to execute the PT vibration damping control when the road during the ABS braking is the low μ road. The determination in Step S102 is made to determine whether the PT vibration damping control can be executed. This determination can be made based on whether a predetermined execution condition is satisfied, for example, whether the state of charge (SOC) of the battery 17 is within an appropriate range. When determination is made that the PT vibration damping control cannot be executed, the process proceeds to Step S104.

Figure 5:
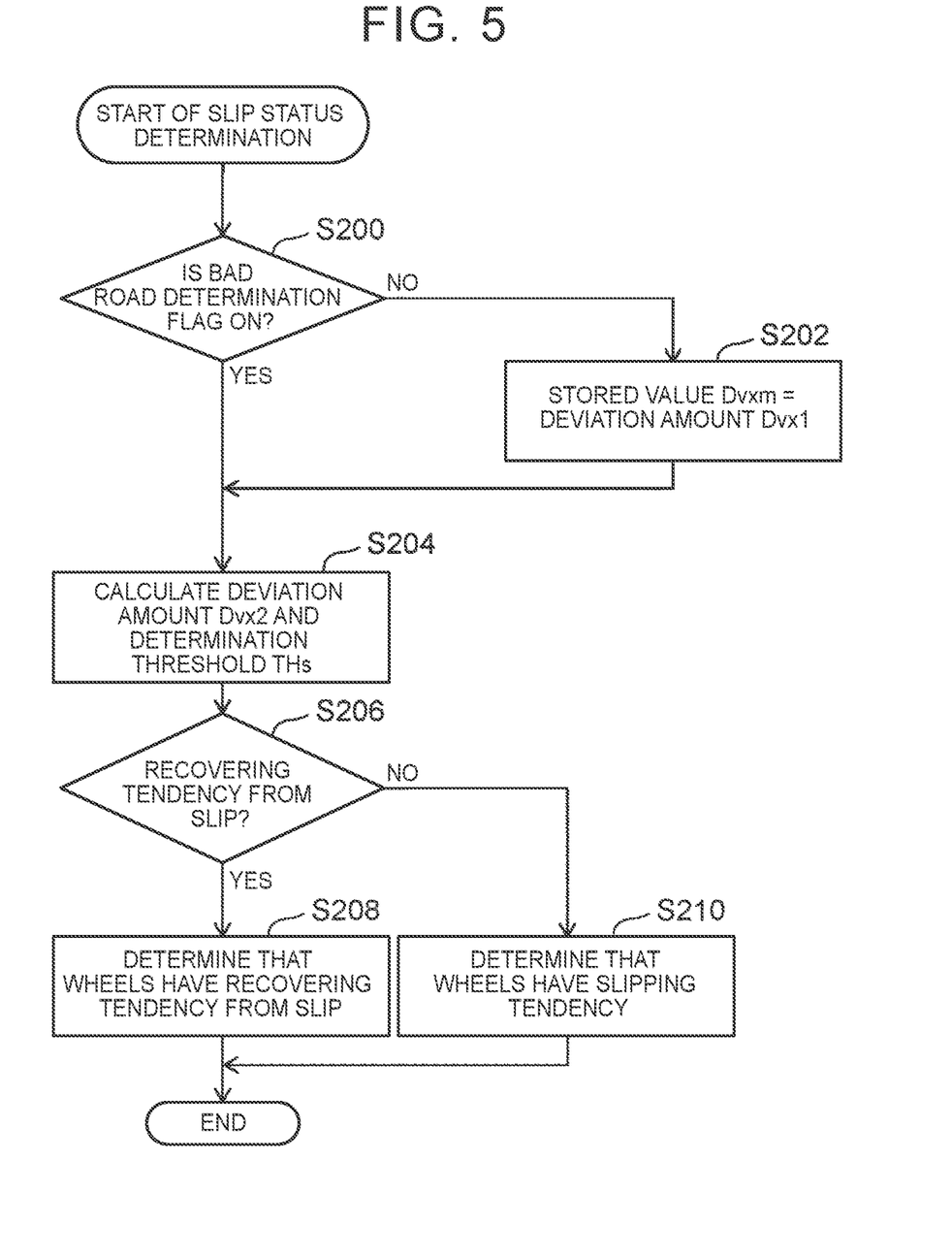
FIG. 5 is a flowchart showing an example of a process related to determination about a slip status in determination as to whether wheels have a recovering tendency from slip in the flowchart of FIG. 4.

In Step S104, the ECU 40 turns OFF a PT vibration damping control request flag. The PT vibration damping control is executed when the PT vibration damping control request flag is ON. In Step S106, the ECU 40 executes determination about the slip status of the wheels 2. FIG. 5 is a flowchart showing an example of a process related to the determination about the slip status in Step S106 of FIG. 4.

In Step S200 of FIG. 5, the ECU 40 determines whether the bad road determination flag is ON. As described above, the bad road determination is permitted during the execution of the first ABS control and prohibited during the execution of the second ABS control. In Step S200, when the first ABS control is being executed, an ON/OFF state of the latest bad road determination flag of the bad road determination executed in parallel is determined. When the second ABS control is being executed, an ON/OFF state of the bad road determination flag of the last bad road determination executed during the immediately preceding execution of the first ABS control is determined.

When the bad road determination flag is OFF in Step S200, the process proceeds to Step S202. In Step S202, the ECU 40 stores a current (latest) deviation amount Dvx1 of the vehicle body speed in the storage device of the ECU 40 as a stored value Dvxm of the deviation amount Dvx1. That is, the stored value Dvxm is updated.

Figure 6:
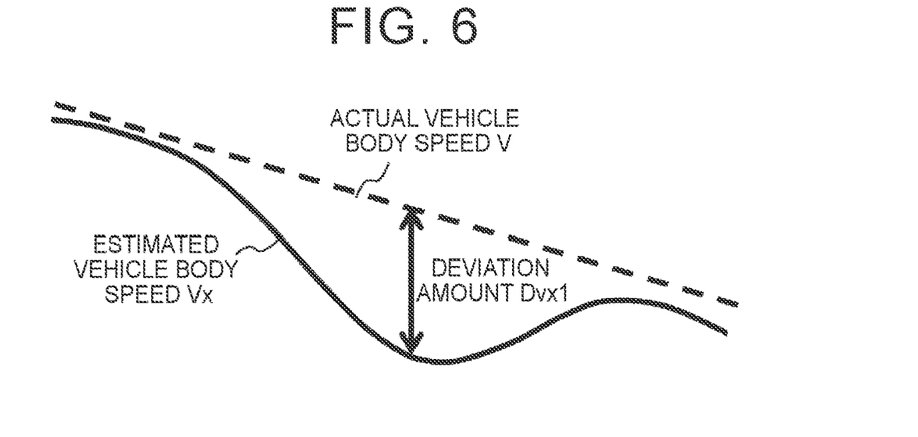
FIG. 6 is a diagram for describing a deviation amount of a vehicle body speed of the vehicle.

FIG. 6 is a diagram for describing the deviation amount Dvx1 of the vehicle body speed. As shown in FIG. 6, the deviation amount Dvx1 corresponds to a deviation amount of the estimated vehicle body speed Vx with respect to the actual vehicle body speed V. For example, the deviation amount Dvx1 is calculated as a value obtained by subtracting the actual vehicle body speed V from the estimated vehicle body speed Vx as represented by Mathematical Expression (2). As shown in FIG. 6, when the estimated vehicle body speed Vx decreases with respect to the actual vehicle body speed V, the deviation amount Dvx1 takes a negative value. The actual vehicle body speed V is calculated by integrating the longitudinal acceleration Gx of the vehicle 1 detected by the longitudinal acceleration sensor 44. An example of the calculation method for the estimated vehicle body speed Vx is described above together with Mathematical Expression (1). Then, the process proceeds to Step S204.

[Mathematical Expression 2]

$$Dvx1 = Vx - V \qquad (2)$$

When the bad road determination flag is ON in Step S200, the process proceeds to Step S204. In Step S204, the ECU 40 calculates the deviation amount Dvx1 based on detected values of the wheel speed sensors 42 and the longitudinal acceleration sensor 44, and then calculates a deviation amount Dvx2 and a determination threshold THs.

The deviation amount Dvx2 is a deviation amount of the vehicle body speed to be finally used for the slip status determination, and is represented by Mathematical Expression (3). The deviation amount Dvx2 is a difference between the deviation amount Dvx1 calculated in Step S204 and the latest stored value Dvxm stored in the process of Step S202. As described above, the stored value Dvxm is continuously updated when the bad road determination flag is OFF. Therefore, the deviation amount Dvx2 takes a value of zero when the bad road determination flag is turned ON. That is, the deviation amount Dvx2 corresponds to the difference of the current deviation amount Dvx1 with respect to the deviation amount Dvx1 at that time.

[Mathematical Expression 3]

$$Dvx2 = Dvx1 - Dvxm \qquad (3)$$

The determination threshold THs is used for comparison with the deviation amount Dvx2 in the slip status determination. As represented by Mathematical Expression (4), the determination threshold THs is the product of the estimated vehicle body speed Vx and a predetermined value S1 (positive value, for example, 25%) of the slip ratio.

[Mathematical Expression 4]

$$THs = Vx \times S1/100 \quad (4)$$

In Step S206, the ECU 40 determines whether the wheels 2 have a recovering tendency from slip or have a slipping tendency. Specifically, this determination can be made, for example, based on whether the deviation amount Dvx2 is larger than the determination threshold THs. This determination may be made based on, for example, whether the brake hydraulic pressure is not in a four-wheel reduced state and the keeping period of the brake hydraulic pressure is not excessive, in combination with whether the deviation amount Dvx2 is larger than the determination threshold THs.

When the determination result in Step S206 is "Yes", the process proceeds to Step S208, and the ECU 40 determines that the wheels 2 have the recovering tendency from the slip (in other words, the estimated vehicle body speed Vx has a recovering tendency). When the determination result in Step S206 is "No", the process proceeds to Step S210, and the ECU 40 determines that the wheels 2 have the slipping tendency.

Figure 7:
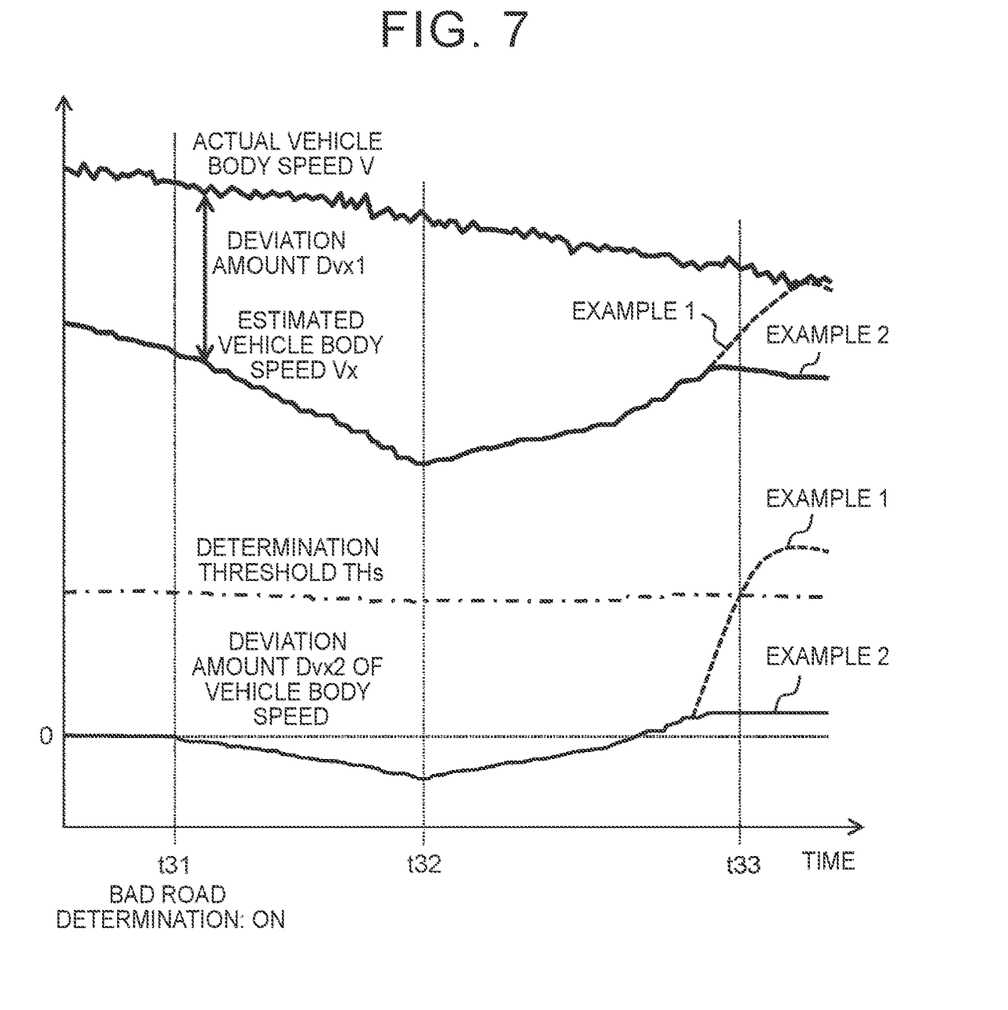
FIG. 7 is a diagram for supplementarily describing the slip status determination process shown in FIG. 5.

FIG. 7 is a diagram for supplementarily describing the slip status determination process shown in FIG. 5. A time t31 in FIG. 7 is a time when the bad road determination flag is turned ON during the ABS braking. The deviation amount Dvx2 defined as described above is zero at the time t31. In the example shown in FIG. 7, the estimated vehicle body speed Vx decreases with respect to the actual vehicle body speed V after the passage over the time t31. As a result, the absolute value of the deviation amount Dvx1 increases. Therefore, the deviation amount Dvx2 increases to the negative side as shown in FIG. 7. When the estimated vehicle body speed Vx starts to increase at a subsequent time t32, the deviation amount Dvx2 starts to increase accordingly. In the state in which the deviation amount Dvx2 is equal to or smaller than the determination threshold THs, determination is made that the wheels 2 have the slipping tendency according to the slip status determination process shown in FIG. 5 (Step S210).

FIG. 7 shows Examples 1 and 2 as waveforms of the estimated vehicle body speed Vx after the time t32. In Example 1 (dashed line), the estimated vehicle body speed Vx continuously increases (the absolute value of the deviation amount Dvx1 continuously decreases). At a time t33, the deviation amount Dvx2 exceeds the determination threshold THs. According to the slip status determination process shown in FIG. 5, determination is made that the wheels 2 have the recovering tendency from the slip at the time t33 when the wheels 2 have been restored (recovered) to a low slip level (Step S208).

In Example 2 (continuous line), the recovery from the slip (restoration) does not sufficiently proceed in terms of the estimated vehicle body speed Vx, and the deviation amount Dvx2 remains smaller than the determination threshold THs. As a result, the determination that the wheels 2 have the slipping tendency (Step S210) is continued.

According to the deviation amount Dvx2 and the determination threshold THs defined as described above, it is possible to grasp (make an evaluation) that the absolute value of the deviation amount Dvx1 has decreased as compared with an amount at which the deviation amount Dvx2 is equal to the determination threshold THs, with respect to the deviation amount Dvx2 at the time when the bad road determination flag is turned ON along with the occurrence of the wheel vibration (that is, zero). Determination is made that the wheels 2 have the recovering tendency from the slip when the absolute value of the deviation amount Dvx1 has decreased as compared with the amount at which the deviation amount Dvx2 is equal to the determination threshold THs, with respect to the deviation amount Dvx2 at the time when the bad road determination flag is turned ON (in other words, the wheel vibration is detected).

In the determination process shown in FIG. 5, the deviation amounts Dvx1 and Dvx2 of the vehicle body speed are used for the slip status determination. Instead of such an example, the slip status determination may be made, for example, by comparing the actual slip ratio S (see Mathematical Expression (1)) with a threshold for the determination.

In FIG. 4, when determination is made in Step S106 that the wheels 2 have the recovering tendency from the slip, the process proceeds to Step S108. In Step S108, the ECU 40 executes the first ABS control (normal ABS control).

When determination is made in Step S106 that the wheels 2 have the slipping tendency, the process proceeds to Step S110. In Step S110, the ECU 40 executes the second ABS control (vibration damping ABS control).

In FIG. 4, when determination is made in Step S102 that the PT vibration damping control can be executed, the process proceeds to Step S112. In Step S112, the ECU 40 turns ON the PT vibration damping control request flag.

In Step S114, the ECU 40 determines whether the wheels 2 have a locking tendency. This determination is made as to whether the wheels 2 have a locking tendency involving the occurrence of slip at a higher level than that when the ABS control execution condition is satisfied. For example, the determination can be made based on whether the actual slip ratio S is equal to or lower than a threshold that is smaller (whose absolute value is larger) than the control start threshold described above.

When determination is made in Step S114 that the wheels 2 have the locking tendency, the process proceeds to Step S116, and the ECU 40 turns OFF the PT vibration damping control request flag. Then, the process proceeds to Step S110. When determination is made in Step S114 that the wheels 2 do not have the locking tendency, the process proceeds to Step S110 while the PT vibration damping control request flag remains ON.

According to the process shown in FIG. 4, when the PT vibration damping control request flag is ON (Step S112) and determination is made in Step S114 that the wheels 2 do not have the locking tendency, the second ABS control (Step S110) is executed regardless of the slip status of the wheels 2 (in other words, regardless of whether the wheels 2 have the recovering tendency from the slip or have the slipping tendency).

In FIG. 4, when determination is made in Step S100 that the road is not the low μ road, the process proceeds to Step S118, and the ECU 40 turns OFF the PT vibration damping control request flag. Then, the process proceeds to Step S108.

According to the process shown in FIG. 4, when determination is made that the wheels 2 have the recovering tendency from the slip in the slip status determination process in Step S106, the ABS control is returned to the first ABS control. As a result, the pressure increasing gradient is increased (normal gradient) as compared with that in the second ABS control. Thus, the vehicle deceleration is secured satisfactorily. When the wheel vibration occurs again during the subsequent ABS braking and the bad road determination flag is turned ON, the pressure increasing gradient is increased from the normal gradient to the steep gradient by the first ABS control. When the wheel vibration increases and the slip level increases as a result and determination is made in Step S106 that the wheels 2 have the slipping tendency, the ABS control is switched again to the second ABS control to suppress the wheel vibration.

According to the present embodiment described above, when the ABS control execution condition is satisfied, the slip status of the wheels 2 is monitored and the ABS control is switched between the first ABS control (normal ABS control) and the second ABS control (vibration damping ABS control) based on the slip status.

Specifically, when the wheels 2 have the slipping tendency, the second ABS control is executed to reduce the pressure increasing gradient of the brake hydraulic pressure as compared with that in the first ABS control. As a result, when the wheels 2 have the slipping tendency, it is possible to suppress transition to the ABS control that exacerbates the slipping tendency due to the occurrence of the wheel vibration. More specifically, it is possible to suppress, during the execution of the first ABS control, erroneous determination that the vehicle is traveling on a bad road because of the occurrence of the wheel vibration, even though the vehicle is not traveling on a bad road. Therefore, it is possible to suppress continuation of the first ABS control and transition to the control focusing on the deceleration suitable for traveling on a bad road (such as an increase in the pressure increasing gradient). As a result, it is possible to suppress the brake hydraulic pressure from becoming excessive for the traveling road of the vehicle 1, thereby suppressing a decrease in the ABS control performance due to the influence of the wheel vibration on a low μ road. When the wheels 2 have the recovering tendency from the slip, the vehicle deceleration is secured satisfactorily by using the first ABS control. Therefore, according to the present embodiment, appropriate ABS control can be executed depending on the road and the slip status.

The wheel vibration during the ABS braking is likely to occur on a low μ road where the road reaction force is small (that is, the vibration is difficult to converge).

According to the present embodiment, when determination is made that the vehicle 1 is traveling on the low μ road, the ABS control is switched between the first ABS control and the second ABS control as described above based on whether the wheels 2 have the recovering tendency from the slip or have the slipping tendency. As a result, the switching can be performed only on the low μ road that really requires such switching. When the wheels 2 have the slipping tendency on the low μ road, the second ABS control using the gentle gradient as the pressure increasing gradient is executed, thereby achieving both the vehicle deceleration and the braking stability. When the wheels 2 have the recovering tendency from the slip even on the low μ road (more specifically, the wheels 2 have been restored to a low slip level), the ABS control is switched (returned) to the first ABS control, thereby securing the execution of the ABS control that prioritizes the vehicle deceleration.

According to the present embodiment, when the PT vibration damping control is being executed during the execution of the ABS control, the second ABS control is executed (selected) regardless of whether the wheels 2 have the recovering tendency from the slip or have the slipping tendency. As a result, the switching of the ABS control based on the slip status on the ABS control side can be restrained from influencing the PT vibration damping control executed during the ABS braking. In addition, the ABS control executed when the PT vibration damping control is executed is not the first ABS control but the second ABS control. As a result, the pressure increasing gradient is not changed during the execution of the ABS control. Thus, the influence of the ABS control on the PT vibration damping control can be reduced as compared with the case where the first ABS control is selected.

In the embodiment described above, the ABS control is switched between the first ABS control and the second ABS control based on the slip status when determination is made that the vehicle 1 is traveling on a low μ road (Step S100; Yes). The ABS control may be switched without the low μ road determination (that is, while the determination in Step S100 is omitted).

What is claimed is:

1. A vehicle control method for controlling a vehicle configured to execute anti-lock braking system control, the anti-lock braking system control including first anti-lock braking system control and second anti-lock braking system control, the first anti-lock braking system control being executed focusing on a vehicle deceleration of the vehicle when determination is made that a road is a bad road based on wheel acceleration information of the vehicle, as compared with a case where determination is made that the road is not the bad road, the second anti-lock braking system control being executed to reduce a pressure increasing gradient of a brake hydraulic pressure of the vehicle as compared with a pressure increasing gradient in the first anti-lock braking system control when determination is made that the road is the bad road based on the wheel acceleration information, the vehicle control method comprising:
    executing the first anti-lock braking system control in a case where a wheel of the vehicle has a recovering tendency from slip when an execution condition of the anti-lock braking system control is satisfied; and
    executing the second anti-lock braking system control in a case where the wheel has a slipping tendency when the execution condition of the anti-lock braking system control is satisfied.

2. The vehicle control method according to claim 1, wherein the wheel acceleration information is an amplitude of a wheel acceleration of the vehicle.

3. The vehicle control method according to claim 1, wherein the wheel acceleration information is an amplitude of a wheel speed of the vehicle.

4. The vehicle control method according to claim 1, further comprising:
    determining, based on the vehicle deceleration, whether the vehicle is traveling on a low μ road having a friction coefficient equal to or lower than a predetermined value; and
    switching, when determination is made that the vehicle is traveling on the low μ road, the anti-lock braking system control between the first anti-lock braking system control and the second anti-lock braking system control based on whether the wheel has the recovering tendency or the slipping tendency.

5. The vehicle control method according to claim 1, further comprising determining that the wheel has the recovering tendency from the slip when a deviation amount of an estimated vehicle body speed with respect to an actual vehicle body speed of the vehicle in a state in which the wheel has the slipping tendency is smaller than a threshold.

6. The vehicle control method according to claim 1, wherein the vehicle includes a power train including one or more electric motors configured to drive at least one of a front wheel and a rear wheel, the vehicle control method further comprising:
- executing vibration damping control for controlling a torque of the one or more electric motors to suppress wheel vibration expected to occur during execution of the anti-lock braking system control; and
- executing, when the vibration damping control is executed, the second anti-lock braking system control regardless of whether the wheel has the recovering tendency or the slipping tendency.

7. A vehicle comprising:
- a braking device including a brake actuator configured to control a brake hydraulic pressure to be applied to a wheel of the vehicle; and
- an electronic control unit configured to control the braking device to execute anti-lock braking system control, wherein
- the anti-lock braking system control includes first anti-lock braking system control and second anti-lock braking system control, the first anti-lock braking system control being executed focusing on a vehicle deceleration of the vehicle when determination is made that a road is a bad road based on wheel acceleration information of the vehicle, as compared with a case where determination is made that the road is not the bad road, the second anti-lock braking system control being executed to reduce a pressure increasing gradient of the brake hydraulic pressure as compared with a pressure increasing gradient in the first anti-lock braking system control when determination is made that the road is the bad road based on the wheel acceleration information, and
- the electronic control unit is configured to execute the first anti-lock braking system control in a case where the wheel has a recovering tendency from slip when an execution condition of the anti-lock braking system control is satisfied, and execute the second anti-lock braking system control in a case where the wheel has a slipping tendency when the execution condition of the anti-lock braking system control is satisfied.

8. The vehicle according to claim 7, wherein the wheel acceleration information is an amplitude of a wheel acceleration of the vehicle.

9. The vehicle according to claim 7, wherein the wheel acceleration information is an amplitude of a wheel speed of the vehicle.

10. The vehicle according to claim 7, wherein:
- the electronic control unit is configured to determine, based on the vehicle deceleration, whether the vehicle is traveling on a low μ road having a friction coefficient equal to or lower than a predetermined value; and
- the electronic control unit is configured to switch, when determination is made that the vehicle is traveling on the low μ road, the anti-lock braking system control between the first anti-lock braking system control and the second anti-lock braking system control based on whether the wheel has the recovering tendency or the slipping tendency.

11. The vehicle according to claim 7, wherein the electronic control unit is configured to determine that the wheel has the recovering tendency from the slip when a deviation amount of an estimated vehicle body speed with respect to an actual vehicle body speed of the vehicle in a state in which the wheel has the slipping tendency is smaller than a threshold.

12. The vehicle according to claim 7, further comprising:
- a power train including one or more electric motors configured to drive at least one of a front wheel and a rear wheel, wherein
- the electronic control unit is configured to execute vibration damping control for controlling a torque of the one or more electric motors to suppress wheel vibration expected to occur during execution of the anti-lock braking system control, and
- the electronic control unit is configured to execute, when the vibration damping control is executed, the second anti-lock braking system control regardless of whether the wheel has the recovering tendency or the slipping tendency.

* * * * *